(12) United States Patent
Ogasawara (10) Patent No.: US 8,166,199 B2
(45) Date of Patent: Apr. 24, 2012

(54) COMMUNICATION APPARATUS, NETWORK SYSTEM, COMMUNICATION METHOD AND PROGRAM

(75) Inventor: Taku Ogasawara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 607 days.

(21) Appl. No.: 12/099,884

(22) Filed: Apr. 9, 2008

(65) Prior Publication Data

US 2008/0252925 A1    Oct. 16, 2008

(30) Foreign Application Priority Data

Apr. 10, 2007    (JP) ................................ 2007-102926

(51) Int. Cl.
*G06F 15/16* (2006.01)

(52) U.S. Cl. ......... 709/238; 709/220; 709/223; 709/224

(58) Field of Classification Search .................. 709/238; 538/1.15
See application file for complete search history.

(56) References Cited

U.S. PATENT DOCUMENTS

| 7,124,171 | B1 * | 10/2006 | McCann | 709/216 |
| 2006/0123079 | A1 * | 6/2006 | Sturniolo et al. | 709/203 |
| 2007/0168514 | A1 * | 7/2007 | Cocotis et al. | 709/225 |

FOREIGN PATENT DOCUMENTS

JP    2006-221423 A    8/2006

* cited by examiner

*Primary Examiner* — Jeffrey Pwu
*Assistant Examiner* — Sulaiman Nooristany
(74) *Attorney, Agent, or Firm* — Rossi, Kimms & McDowell LLP

(57) ABSTRACT

A communication apparatus which eliminate the necessity of providing a particular server in a predetermined network and which makes it possible to participate into the network with the use of a predetermined address. A first communication apparatus participating in a predetermined network holds a predetermined address to be used by a second communication apparatus not participating in the predetermined network in order to communicate with a third communication apparatus participating in the predetermined network when participating into the predetermined network, as the address of the first communication apparatus. The second communication apparatus communicates with the first communication apparatus with the use of the predetermined address when the second communication apparatus participates into the predetermined network. The first communication apparatus requests the third communication apparatus to hold the predetermined address as the address of the third communication apparatus in the case where the communication apparatus separates from the predetermined network.

15 Claims, 8 Drawing Sheets

| IP address | life time(min) |
|---|---|
| 3fee:1245::2345 | 64 |
| 3fee:1245::2333 | 42 |
| 3fee:1245::2356 | 104 |
| 3fee:1245::2321 | 21 |
| 3fee:1245::2346 | 5 |
| ... | |
| ... | |
| ... | |
| ... | |

COMMUNICATION APPARATUS, NETWORK SYSTEM, COMMUNICATION METHOD AND PROGRAM

BACKGROUND OF THE INVENTION

1. Field of the Invention

The present invention relates to a communication apparatus, a network system, a communication method applied to a network system and a communication apparatus, and a program for causing a computer to implement the communication method.

2. Description of the Related Art

Conventionally, as a system for simultaneously distributing data to a plurality of users, the server-client type system has been the mainstream in which a server for performing centralized management of information resources such as a database is arranged and the server distributes the information resources it manages to users, that is, the clients of the server. However, this method has some problems such as the problem that the load is concentrated on the server and the problem that installation of the server requires a cost.

It is a peer-to-peer network that was devised in order to solve such problems. The peer-to-peer network is a virtual network constructed by connecting node apparatuses with each other not via a server. In this peer-to-peer network, it is possible to exchange information with an unspecified large number of partners (node apparatuses) (for example, see Japanese Laid-Open Patent Publication (Kokai) No. 2006-221423).

However, in a peer-to-peer network (virtual network), a node apparatus not participating in the peer-to-peer network cannot acquire node information about the node apparatuses on the peer-to-peer network at all. Therefore, it has been a problem of the peer-to-peer network how a node apparatus not participating in the peer-to-peer network can find a node apparatus participating in the peer-to-peer network.

There is a method in which, in order to find a node apparatus participating in a peer-to-peer network, a particular server is used as an access point only at the time of participating into the peer-to-peer network. However, this method requires that the particular server should be provided, and the cost therefor is required.

There is also a method in which connection to the node apparatus connected at the last participation into a peer-to-peer network is attempted again. However, in this method, it is not possible to participate in the peer-to-peer network if the node apparatus has already separated from the peer-to-peer network.

SUMMARY OF THE INVENTION

The present invention provides a communication apparatus, a network system, a communication method and a program which eliminate the necessity of providing a particular server in a predetermined network and which make it possible to participate into the network with the use of a predetermined address In a first aspect of the present invention, there is provided a communication apparatus participating in a predetermined network comprising an address holding unit adapted to hold a predetermined address to be used by a first communication apparatus not participating in the predetermined network in order to communicate with a second communication apparatus participating in the predetermined network when participating into the predetermined network, as the address of the communication apparatus, a receiving unit adapted to receive data addressed to the predetermined address, and a request unit adapted to request the second communication apparatus to hold the predetermined address as the address of the second communication apparatus in the case where the communication apparatus separates from the predetermined network.

With the arrangement of the present invention, it is possible to eliminate the necessity of providing a particular server for a predetermined network (for example, a peer-to-peer network), and an apparatus not participating in the predetermined network can participate into the predetermined network with the use of a predetermined address.

In a second aspect of the present invention, there is provided a network system constituting a predetermined network comprising an address holding unit provided for a first communication apparatus participating in a predetermined network and adapted to held a predetermined address to be used by a second communication apparatus not participating in the predetermined network in order to communicate with a third communication apparatus participating in the predetermined network when participating into the predetermined network, as the address of the first communication apparatus, a communication unit provided for the second communication apparatus and adapted to communicate with the first communication apparatus with the use of the predetermined address when the second communication apparatus participates into the predetermined network, and a request unit provided for the first communication apparatus and adapted to request the third communication apparatus to hold the predetermined address as the address of the third communication apparatus in the case where the first communication apparatus separates from the predetermined network.

In a third aspect of the present invention, there is provided a communication method applied to a communication apparatus participating in a predetermined network, the communication method comprising an address holding step of holding a predetermined address to be used by a first communication apparatus not participating in the predetermined network in order to communicate with a second communication apparatus participating in the predetermined network when participating into the predetermined network, as the address of the communication apparatus, a receiving step of receiving data addressed to the predetermined address, and a request step of requesting the second communication apparatus to hold the predetermined address as the address of the second communication apparatus in the case where the communication apparatus separates from the predetermined network.

In a fourth aspect of the present invention, there is provided a communication method applied to a network system constituting a predetermined network, comprising an address holding step of a first communication apparatus, which participates in a predetermined network, holding a predetermined address to be used by a second communication apparatus not participating in the predetermined network in order to communicate with a third communication apparatus participating in the predetermined network when participating into the predetermined network, as the address of the first communication apparatus, a communication step of the second communication apparatus communicating with the first communication apparatus with the use of the predetermined address when the second communication apparatus participates into the predetermined network, and a request step of the first communication apparatus requesting the third communication apparatus to hold the predetermined address as the address of the third communication apparatus in the case where the communication apparatus separates from the predetermined network.

In a fifth aspect of the present invention, there is provided a program for causing a computer to implement a communication method applied to a communication apparatus participating in a predetermined network, wherein the communication method comprising an address holding step of holding a predetermined address to be used by a first communication apparatus not participating in the predetermined network in order to communicate with a second communication apparatus participating in the predetermined network when participating into the predetermined network, as the address of the communication apparatus, a receiving step of receiving data addressed to the predetermined address, and a request step of requesting the second communication apparatus to hold the predetermined address as the address of the second communication apparatus in the case where the communication apparatus separates from the predetermined network.

In a sixth aspect of the present invention, there is provided a program for causing a computer to implement a communication method applied to a network system constituting a predetermined network, wherein the communication method comprising an address holding step of a first communication apparatus, which participates in a predetermined network, holding a predetermined address to he used by a second communication apparatus not participating in the predetermined network in order to communicate with a third communication apparatus participating in the predetermined network when participating into the predetermined network, as the address of the first communication apparatus, a communication step of the second communication apparatus, communicating with the first communication apparatus with the use of the predetermined address when the second communication apparatus participates into the predetermined network, and a request step of the first communication apparatus requesting the third communication apparatus to hold the predetermined address as the address of the third communication apparatus in the case where the communication apparatus separates from the predetermined network.

Further features of the present invention will become apparent from the following description of exemplary embodiments with reference to the attached drawings.

DESCRIPTION OF THE EMBODIMENTS

The present invention will now be described in detail with reference to the drawings showing preferred embodiments thereof.

It should be noted that the relative arrangement of the components, the numerical expressions and numerical values set forth in these embodiments do not limit the scope of the present invention unless it is specifically stated otherwise.

Figure 1:
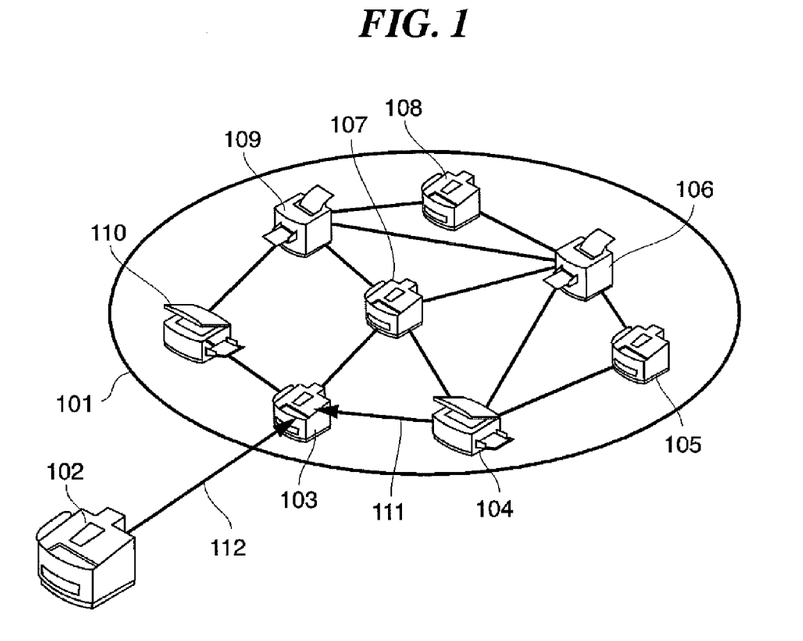
FIG. 1 is a block diagram showing the whole configuration of a virtual network system according to an embodiment of the present invention.

FIG. 1 is a block diagram showing the whole configuration of a network system according to an embodiment of the present invention.

In FIG. 1, a plurality of node apparatuses 103 to 110 are mutually connected to constitute a peer-to-peer network (virtual network) 101. A node apparatus 102 is a node apparatus which does not constitute the peer-to-peer network 101. Here, each of the node apparatuses 102 to 110 is a printer having a communication function. However, they are not necessarily limited to a printer. They may be a communication apparatus capable of performing network communication, such as a digital complex machine, a digital copying machine, a TV set and a personal computer. In this embodiment, the node apparatuses 103 to 110 constituting the peer-to-peer network 101 communicate with one another via a wired LAN or a wireless LAN. However, the communication path connecting the node apparatuses 103 to 110 with one another is not limited to a LAN (local area network).

Figure 2:
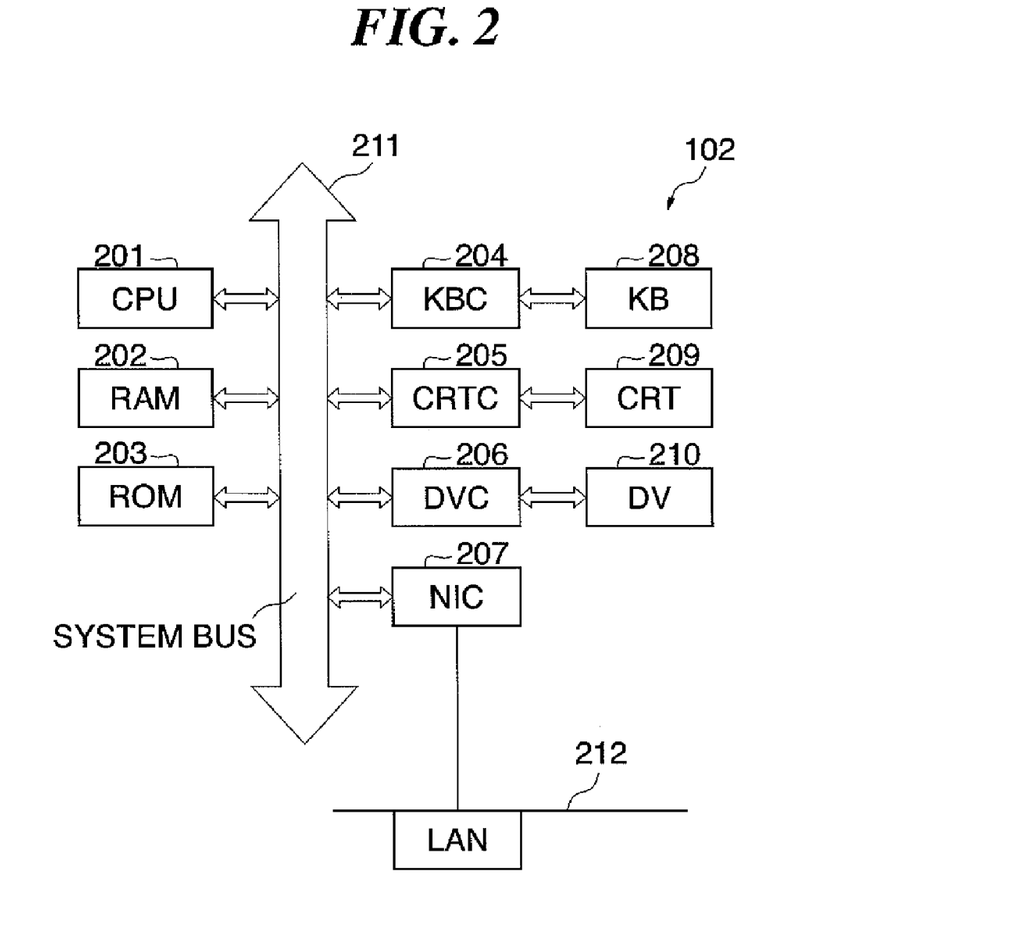
FIG. 2 is a block diagram showing the internal configuration of a node apparatus in FIG. 1.

FIG. 2 is a block diagram showing the internal configuration of the node apparatus 102 in FIG. 1. Here, the node apparatuses 102 to 110 are assumed to have the same configuration, and only the internal configuration of the node apparatus 102 will be described. As for the other node apparatuses, the same component is given the same reference numeral, and description thereof is omitted.

The node apparatus 102 is provided with a CPU 201 which executes a control program stored in a ROM 203, and it performs overall control of the devices connected to a system bus 211. By the CPU 201 executing the control program, the functions of a network control section and the functions of a device (printer) control section are realized.

Reference numeral 202 denotes a RAM, which functions as the main memory, the work area and the like of the CPU 201. The RAM 202 also stores the counter information update interval, print job information, jobs and the like. It also functions as a backup RAM for storing system information such as the counter information update interval. The print job information and the jobs may be stored in a different storage device (not shown) such as a hard disk.

Reference numeral 204 denotes a keyboard controller (KBC), which performs input control of instruction information inputted from a keyboard (KB) 208. Reference numeral 205 denotes a CRT controller (CRTC), which performs display control of a CRT display 209. A user can edit application information or timer information with the use of the keyboard (KB) 208 and the CRT display 209. It is also possible to configure a virtual keyboard with the use of a touch panel on a liquid crystal panel and use it instead of the keyboard (KB) 208.

Reference numeral 206 denotes a device controller (DVC), which controls the operation of a printer (DV) 210. Reference numeral 207 denotes a network interface card (NIC), which performs bidirectional data communication with other network equipments and PCs (personal computers) via a LAN 212. In the example shown in FIG. 1, the other network equipments correspond to the node apparatuses 103 to 110.

Returning to FIG. 1, each of the node apparatuses 103 to 110 is given an IPv6 address (hereinafter simply referred to as "IP address"). A predetermined IP address called an initial node address can be also set for each of the node apparatuses 103 to 110 as its own IP address, in addition to its own IP address. For example, in the case of setting the initial node address only for the node apparatus 103 as its own IP address, its initial node address holding setting is ON (enabled), and the initial node address holding setting of the other node apparatuses 104 to 110 is OFF (disabled). When the initial node address holding setting is enabled, the node apparatus 103 holds a predetermined initial node address in the RAM 202 as its own IP address (an address holding unit). Hereinafter, it is referred to as "to hold an initial node address" that the initial node address holding setting is enabled. The node apparatus 103 holding the initial node address receives data transmitted to the initial node address. When the peer-to-peer network 101 is configured, any one of the node apparatuses 103 to 110 on the peer-to-peer network 101 holds the initial node address. The initial node address is assumed to be configured by adding a predetermined value (a fixed value) to a prefix acquired from a router.

The initial node address may be a global address in the IPv6 address space.

The node apparatuses 103 to 110 constituting the peer-to-peer network 101 may open the resources they hold so that the resources may be shared. The number of the node apparatuses constituting the peer-to-peer network 101 is not limited to that shown in FIG. 1.

Figure 3:
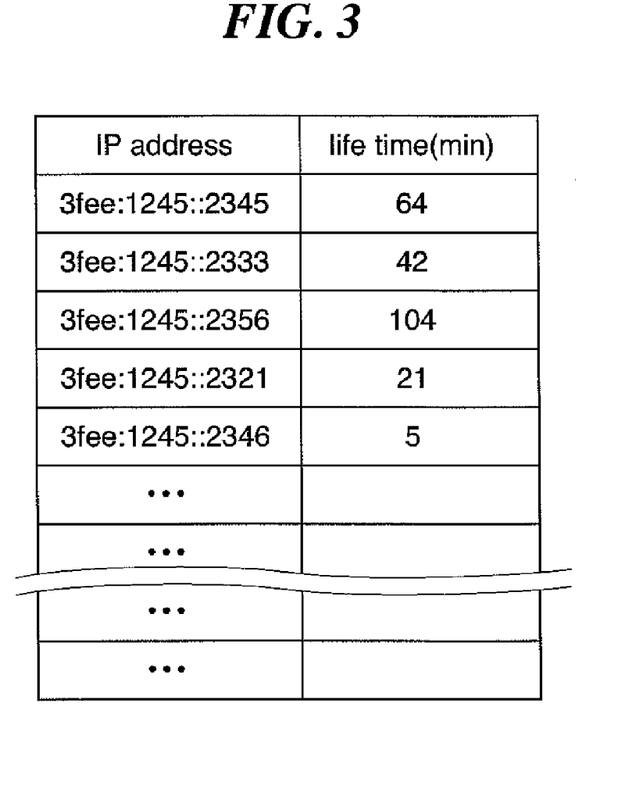
FIG. 3 is a diagram showing an example of a list of participating nodes.

The node apparatus 103 holding the initial node address manages a list of participating nodes indicating one or more node apparatuses currently participating in the peer-to-peer network 101. In the list of participating nodes, the IP addresses of all the participating node apparatuses and the remaining time left until separation (herein after simply referred to "the life time") of each node apparatus are described. The life time is state information indicating the time left until each node apparatus participating currently separates from the peer-to-peer network. FIG. 3 is a diagram showing an example of the list of participating nodes. The node apparatus 103 stores this list of participating nodes in the RAM 202 (an address storage unit, and a life time storage unit or a state information storage unit).

There may be a case where it is not desirable that a node apparatus always participates in a peer-to-peer network, and therefore, the life time is set in advance for each of the node apparatuses 103 to 110. That is, the life time is time left until each of the node apparatuses 103 to 110 participating in the peer-to-peer network separates from the peer-to-peer network. For example, in the case of the node apparatus 103 provided with an energy-saving mode, the time left until the node apparatus 103 separates from the peer-to-peer network and transitions to the energy-saving mode may be set as the life time. In this case, the life time is time set in order to avoid wasteful energy consumption which would occur in the node apparatus 103 by the node apparatus 103 always participating in the peer-to-peer network. In the case of a peer-to-peer network in which contents are shared, time required until the node apparatus 103 finishes downloading contents may be set as the life time of the node apparatus 103.

When the node apparatus 102 attempts to newly participate into the peer-to-peer network 101, it transmits a participation notification (participation data) to the initial node address (that is, to the node apparatus 103 holding the initial node address) (112 in FIG. 1). That is, the node apparatus 102 participates into the peer-to-peer network 101 by communicating with the node apparatus 103 with the use of the initial node address.

When the node apparatus 103 holding the initial node address separates from the peer-to-peer network 101, it refers to the list of participating nodes and selects a node apparatus having the longest life time. For example, if the node apparatus 104 is selected, the node apparatus 103 transmits a request to hold the initial node address (request data) to the node apparatus 104. When receiving an acceptance notification in response thereto from the node apparatus 104 (111 in FIG. 1), the node apparatus 103 transfers the initial node address to the node apparatus 104.

It is possible to regard the initial node address as having been transferred, by the node apparatus 103 disabling its initial node address holding setting and the node apparatus 104 enabling its initial node address holding setting It is also possible to regard the initial node address as having been transferred, by the list of participating nodes being transmitted and received between the node apparatuses 103 and 104. In the case of omitting the acceptance notification, it is also possible to regard the initial node address as having been transferred, by the request to hold the initial node address being transmitted and received between the node apparatuses 103 and 104.

Next, description will be made on processing related to holding of the initial node address, management of the list of participating nodes, and separation from the peer-to-peer network in the node apparatuses 103 to 110, with reference to FIGS. 4 and 5.

Figure 4:
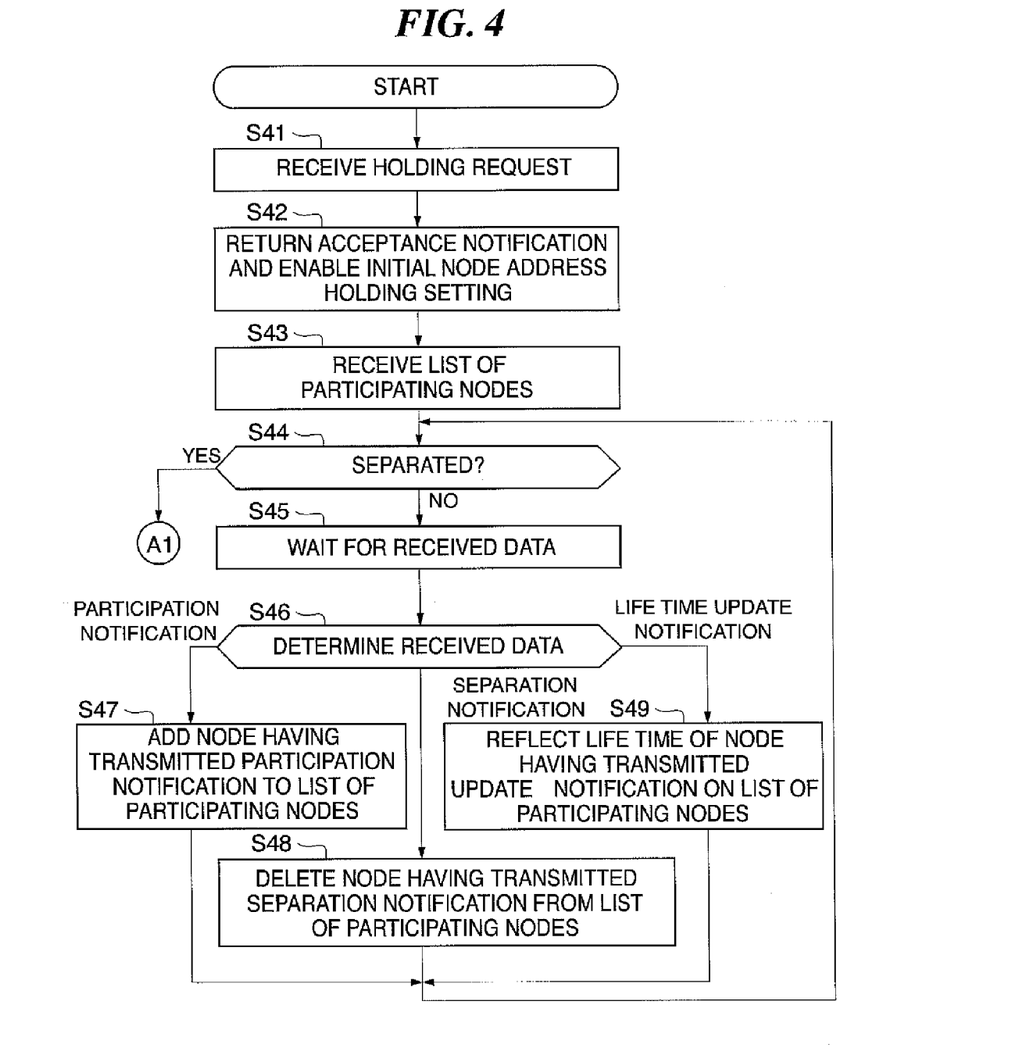
FIG. 4 is a flowchart showing the procedure for processing related to holding of an initial node address, management of the list of participating nodes and separation from a peer-to-peer network, which is executed by the CPD of each node apparatus.
Figure 5:
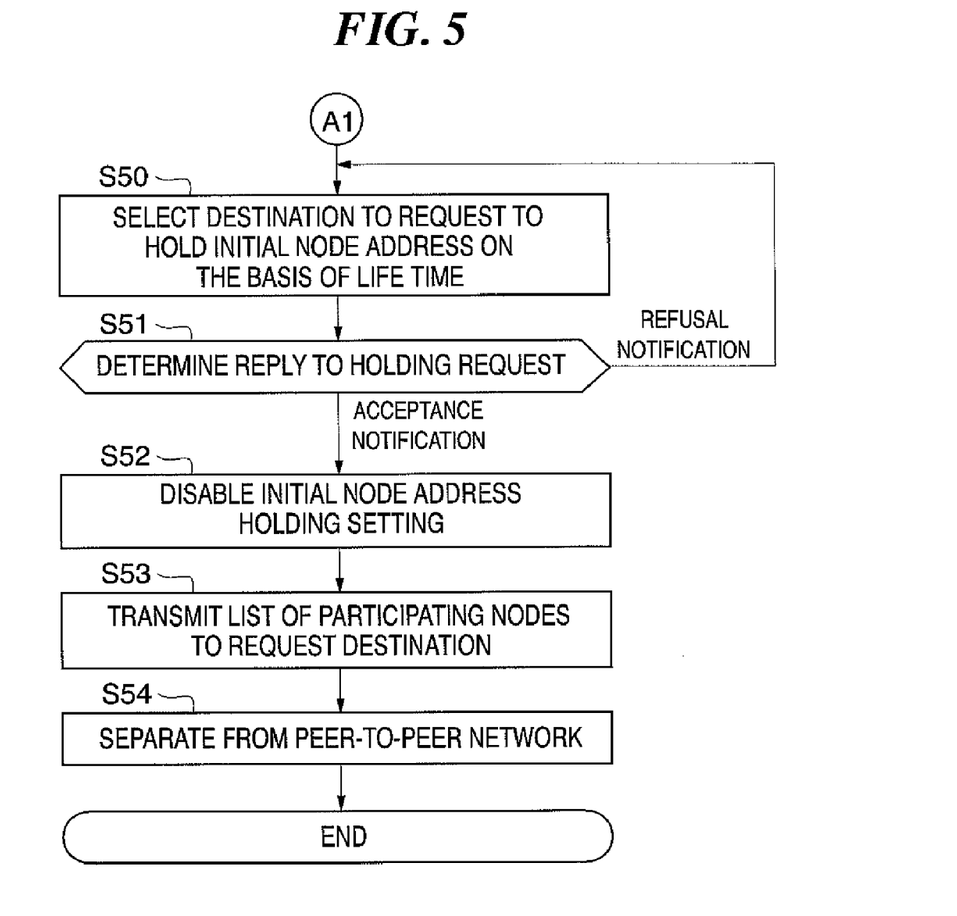
FIG. 5 is a flowchart continued from the flowchart in FIG. 4.

FIGS. 4 and 5 are flowcharts showing the procedure for processing related to holding of the initial node address, management of the list of participating nodes and separation from a peer-to-peer network, which is executed by the CPU of each node apparatus. In this embodiment, only the processing by the CPU 201 of the node apparatus 104 will be described. As for the other node apparatuses 103, and 105 to 110, description thereof will be omitted.

The node apparatus 104 receives a request to hold the initial node address, from the node apparatus 103 having the initial node address (step S41).

The node apparatus 104 which has received this holding request transmits an acceptance notification in response thereto to the node apparatus 103 and enables its initial node address holding setting (step S42).

Then, the node apparatus 104 receives the list of participating nodes from the node apparatus 103 (step S43).

Next, the node apparatus 104 determines whether or not the life time set for itself has elapsed and it has to separate from the peer-to-peer network 101 (step S44). As a result, if it is determined that the life time has elapsed and it has to separate, then the node apparatus 104 proceeds to step S50. If it is determined that the life time has not elapsed yet, then the node apparatus 104 proceeds to step S45

At step S45, the node apparatus 104 waits to receive data transmitted from the other node apparatuses. When receiving data, the node apparatus 104 determines what the received data is (step S46). If the received data is a notification to participate into the peer-to-peer network 101, then the node apparatus 104 proceeds to step S47. If the received data is a notification to separate (separation data) from the peer-to-peer network 101, then the node apparatus 104 proceeds to step S48. If the received data is a notification to update life time (update data), then the node apparatus 104 proceeds to step S49. While waiting to receive data transmitted from the other node apparatuses at step S45, the node apparatus 104 may perform image forming processing or the like which is not related to a processing using the peer-to-peer network 101.

At step S47, the node apparatus 104 adds the IP address of the node apparatus which has transmitted the participation notification to the list of participating nodes which the node apparatus 104 manages. In this case, the node apparatus 104 also registers the life time included in the participation notification with the list of participating nodes.

At step S48, the node apparatus 104 deletes the IP address of the node apparatus which has transmitted the separation notification and the life time corresponding thereto from the list of participating nodes which the node apparatus 104 manages.

At step S49, the node apparatus 104 updates the life time of the node apparatus which has transmitted the update notification with new life time included in the update notification, in the list of participating nodes which the node apparatus 104 manages.

At step S50, the node apparatus 104 first selects the longest life time among a plurality of the life times described in the list of participating nodes it manages in order to separate from the peer-to-peer network 101. Then, the node apparatus 104 transmits a request to hold the initial node address to the IP address corresponding to the selected life time.

If receiving a reply from the node apparatus which has received the holding request, the node apparatus 104 determines whether or not the reply is an acceptance notification or a refusal notification (step S51). If the reply is an acceptance notification, the node apparatus 104 proceeds to step S52. On the other hand, if the reply is a refusal notification, the node apparatus 104 returns to step S50, selects the next longest life time from among a plurality of the life times described in the list of participating nodes, and transmits a request to hold the initial node address to the IP address corresponding to the selected life time.

At step S52, the node apparatus 104 disables its initial node address holding setting. The node apparatus 104 also deletes its own IP address from the list of participating nodes which it manages, and transmits the list of participating nodes to the node apparatus which has transmitted the acceptance notification in response to the holding request, as the request destination (step S53).

After that, the node apparatus 104 separates from the peer-to-peer network 101 (step S54).

Next, description will be made on participation and separation of a node apparatus into and from a peer-to-peer network, with reference to FIG. 6.

Figure 6:
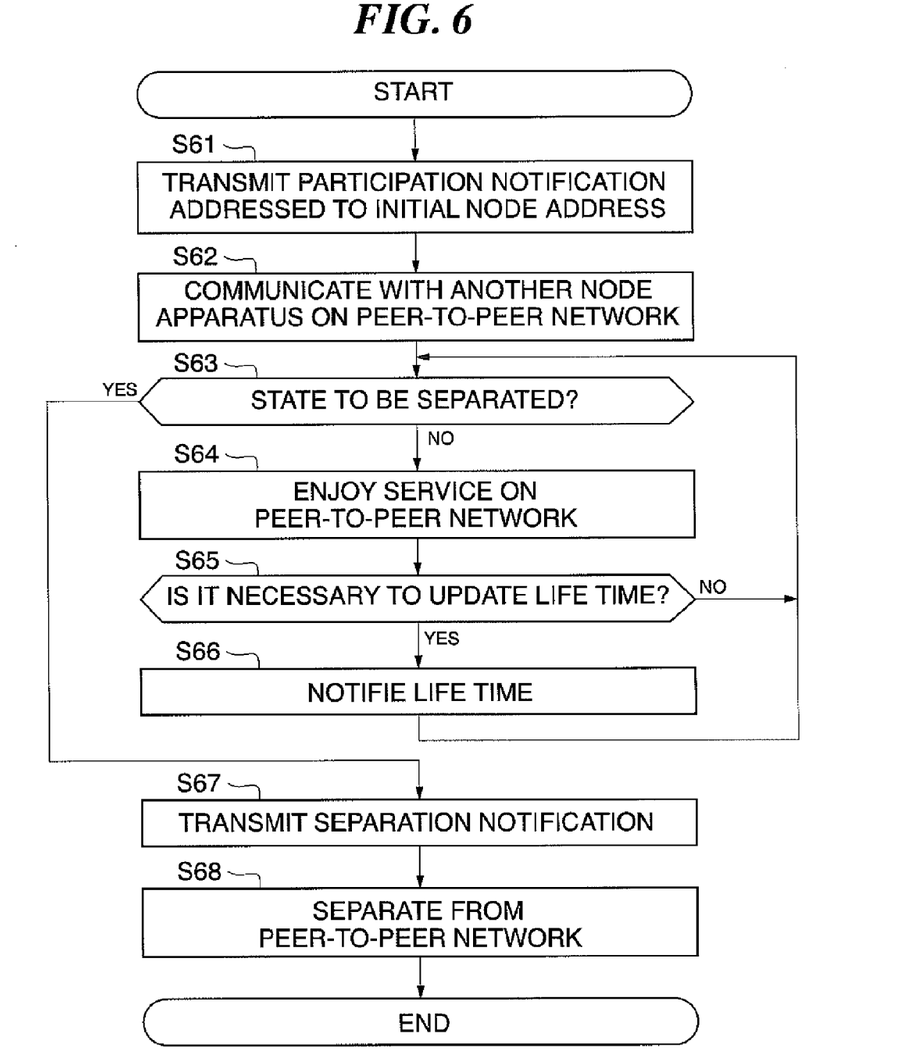
FIG. 6 is a flowchart showing the procedure for processing to be executed by the CPU of a node apparatus which newly participates into a peer-to-peer network 101.

FIG. 6 is a flowchart showing the procedure for processing to be executed by the CPU 201 of the node apparatus 102 which newly participates into the peer-to-peer network 101. This is the processing related to participation into a peer-to-peer network, provision/enjoyment of a service on the peer-to-peer network, update of life time, and separation from the peer-to-peer network.

The node apparatus 102 which newly participates into the peer-to-peer network 101 first connects to a node apparatus holding the initial node address (for example, the node apparatus 103 in FIG. 1) and transmits a participation notification to the initial node address (step S61). In this case, the node apparatus 102 transmits a participation notification including the life time set for itself. Thus, the node apparatus 102 participates into the peer-to-peer network 101.

Then, the node apparatus 102 acquires node information about the other node apparatuses participating in the peer-to-peer network 101 from the node apparatus 103, and performs communication with the other node apparatuses participating in the peer-to-peer network 101 (step S62). The node information acquired here includes the IP addresses registered with the list of participating nodes. In the case where contents management information indicating the names, sizes, kinds and the like of the contents data held by the node apparatuses are also registered with the list of participating nodes in addition to the IP addresses, the contents management information may be also acquired as the node information.

Next, the node apparatus 102 determines whether or not the life time set for itself has elapsed and it has to separate from the peer-to-peer network 101 (step S63). As the result, if it is determined that the life time has elapsed and it has to separate, then the node apparatus 102 proceeds to step S67. When it is determined that the life time has not elapsed yet, then the node apparatus 102 proceeds to step S64.

At step S64, the node apparatus 102 enjoys a service on the peer-to-peer network 101 (step S64).

After that, the node apparatus 102 determines whether or not it is necessary to update the life time set for itself (step S65). As a result, if it is necessary to update the life time, the node apparatus 102 proceeds to step S66. Otherwise, the node apparatus 102 returns to step S63. Specifically, in the case of reducing the life time with the lapse of time or in the case of increasing the life time again, it is determined that it is necessary to update the life time (YES in step S65), and the node apparatus 102 proceeds to step S66.

At step S66, the node apparatus 102 connects to the node apparatus 103 holding the initial node address and transmits an update notification including new life time of the node apparatus 102, to the initial node address. Receiving this, the node apparatus 103 updates the life time of the node apparatus 102 in the list of participating nodes it manages with the life time included in the update notification. After that, the node apparatus 102 returns to step S63.

At step S67, the node apparatus 102 transmits a separation notification to the initial node address (to the node apparatus 103 holding the initial node address) in order to separate from the peer-to-peer network 101. After that, the node apparatus 102 separates from the peer-to-peer network 101 (step S68).

There may be a case where, though a node apparatus (in this embodiment, the node apparatus 102 in FIG. 1) attempts to connect a node apparatus holding the initial node address (in this embodiment, the node apparatus 103 in FIG. 1) in order to participate into the peer-to-peer network 101, such connection fails. There may also be a case where, though a node apparatus (in this embodiment, the node apparatus 110 in FIG. 1) attempts to connect to a node apparatus holding the initial node address (in this embodiment, the node apparatus 103 in FIG. 1) in order to update its life timer such connection fails. The operation of the node apparatus 102 or the node apparatus 110 performed in such cases will be described with reference to FIGS. 7 and 8. As for the node apparatuses 104-110, description thereof will be omitted.

Figure 7:
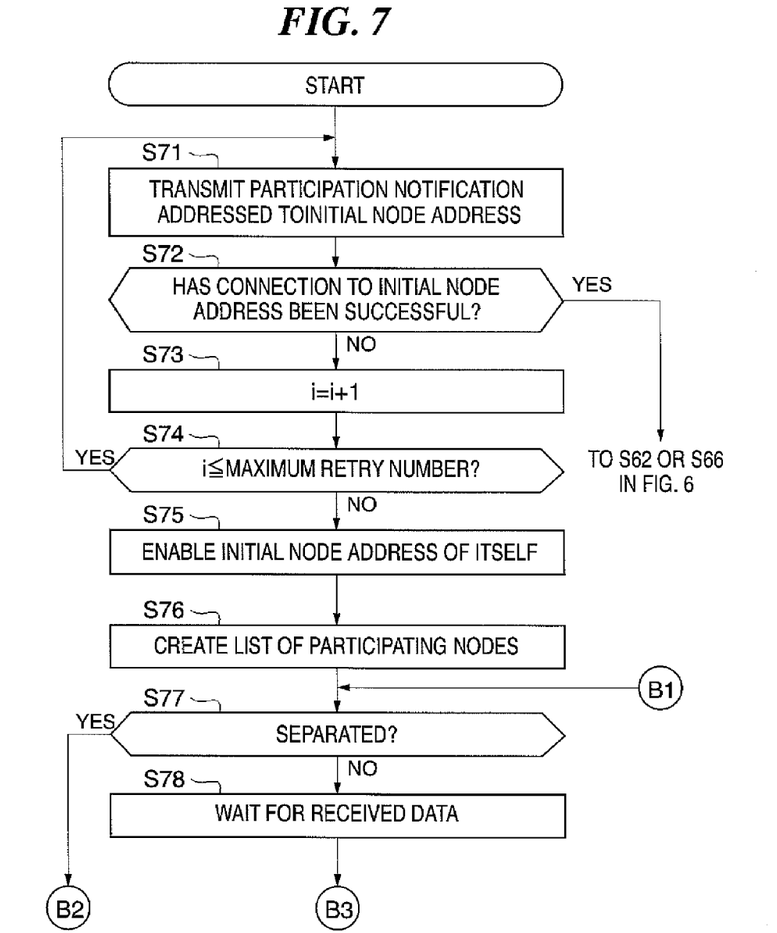
FIG. 7 is a flowchart showing the procedure for processing to be executed by the CPU of a node apparatus which cannot connect to a node apparatus holding the initial node address or a node apparatus managing the list of participating nodes in order to execute step S61 or 566 in FIG. 6.
Figure 8:
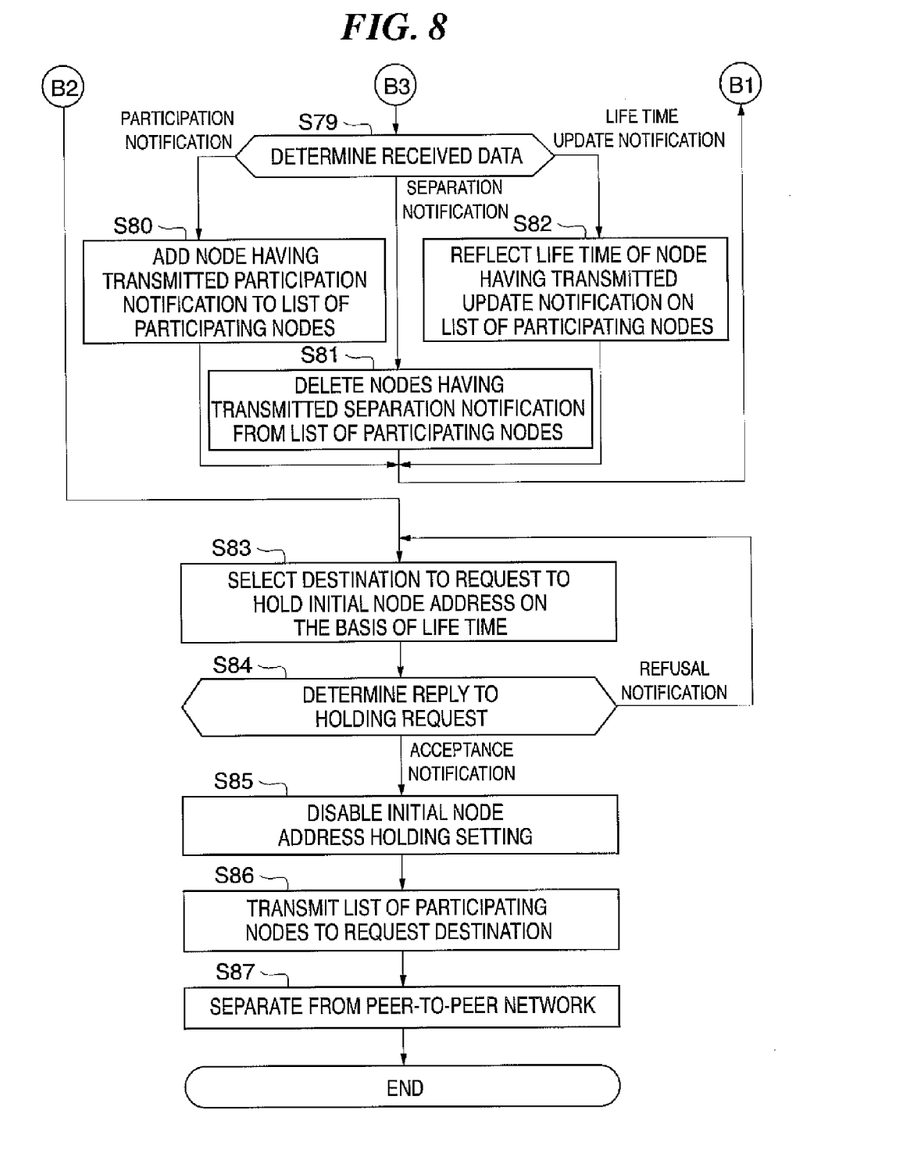
FIG. 8 is a flowchart continued from the flowchart in FIG. 7 showing the procedure for processing to be executed by the CPU of a node apparatus which cannot connect to a node apparatus holding the initial node address or a node apparatus managing the list of participating nodes.

FIGS. 7 and 8 are flowcharts showing the procedure for processing to be executed by the CPU 201 of the node apparatus 102 which cannot connect to a node apparatus holding an initial node address in order to execute step S61 or S66 in FIG. 6.

Here, the node apparatus 102 again attempts connection by transmitting a participation notification addressed to the initial node address (step S71). In this case, the node apparatus 102 determines whether or not connection has been successful (step S72). As a result, if connection has been successful (YES in step S72), the node apparatus 102 proceeds to step S61 or step S66 in FIG. 6. If connection has not been successful (NO in step S72), the node apparatus 102 proceeds to step S73.

At step S73, the node apparatuses 102 increments connection retry number by 1. Here, the connection retry number i is the number of times that the node apparatus 103 attempts to transmit the participation notification addressed to the initial node address. Then, it is determined whether or not the connection retry number i is equal to or below a predetermined maximum retry number (step S74). As a result, if the connection retry number i is equal to or below the maximum retry number (a predetermined number of times), the node apparatus 102 returns to step S71. If the connection retry number i exceeds the predetermined maximum retry number, the node apparatus 102 proceeds to step S75. Thus, the attempt to connect to the node apparatus 103 based on the initial node address can be performed only the number of times corresponding to the predetermined maximum retry number.

Though the node apparatus 102 attempted connection to the node apparatus 103 based on the initial node address the number of times corresponding to the predetermined maximum retry number, it could not connect, then, at step S75, the node apparatus 102 enables its initial node address holding setting and becomes a node apparatus holding the initial node address. That is, in the case where the node apparatus 103 holding the initial node address cannot communicate for some reason or in the case where a node apparatus holding the initial node address does not exist, the node apparatus 102 becomes the node apparatus holding the initial node address. Then, the node apparatus 102 newly creates a list of participating nodes (step S76).

Since the contents of steps S77 to S87 described below are basically the same as those of steps S44 to S54 shown in FIGS. 4 and 5, description thereof will be omitted. However, at step S82, the node apparatus 102 which has received an update notification updates the life time of the node apparatus which has transmitted the update notification with the life time included in the update notification, in the list of participating nodes it manages, similarly to step S49. On the other hand, if the node apparatus which has transmitted the update notification is not described in the list of participating nodes, the IP address of the node apparatus and the life time included in the update notification are added to the list of participating nodes.

As described above, in this embodiment, an initial node address is set for a node apparatus which is to be accessed at the time of participating into a peer-to-peer network, and the node apparatus for which the initial node address is set necessarily participates in the peer-to-peer network. That is, when the node apparatus for which the initial node address is set separates from the peer-to-peer network, it transfers the initial node address to another node apparatus on the peer-to-peer network. Thereby, the necessity of providing a server for the peer-to-peer network is eliminated, and it is possible to participate into the peer-to-peer network at any time only by accessing a node apparatus for which the initial node address is set.

Though, in this embodiment, each of the node apparatuses 102 to 110 is a printer having a communication function, the node apparatuses 102 to 110 may be any other apparatus if a communication function is provided.

[Other Embodiments]

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-102926 filed Apr. 10, 2007, which is hereby incorporated by reference herein in its entirety.

What is claimed is:

1. A first communication apparatus participating in a predetermined network comprising:

an address holding unit adapted to hold a predetermined address to be used by a second communication apparatus not participating in the predetermined network in order to communicate with a third communication apparatus participating in the predetermined network when the second communication apparatus does participate in the predetermined network, as the address of the first communication apparatus;

a receiving unit adapted to receive data addressed to the predetermined address; and a request unit adapted to request the third communication apparatus to hold the predetermined address as the address of the third communication apparatus in the case where the first communication apparatus separates from the predetermined network, wherein the request unit performs the request before the first communication apparatus actually separates from the predetermined network, wherein said units are implemented by physical components of said first communication apparatus, wherein the first communication apparatus further comprises a remaining time storage unit adapted to store a remaining time left until each of communication apparatuses participating in the predetermined network, which has transmitted participation data addressed to the predetermined address to participate into the predetermined network, separates from the predetermined network, and wherein the third communication apparatus is an apparatus corresponding to the longest remaining time among the remaining times stored in said remaining time storage unit.

2. The first communication apparatus according to claim 1, wherein the second communication apparatus comprises a participation data transmitting unit adapted to transmit the participation data addressed to the predetermined address to participate into the predetermined network, and the first communication apparatus further comprising an address storage unit adapted to store the address of the third communication apparatus and an adding unit adapted to add, on the basis of the participation data which has been received by said receiving unit, the address of the second communication apparatus to said address storage unit so that the second communication apparatus participates into the predetermined network.

3. The first communication apparatus according to claim 2, wherein the third communication apparatus comprises a separation data transmitting unit adapted to transmit a separation data addressed to the predetermined address to separate from the predetermined network, and
the first communication apparatus further comprises a deletion unit adapted to delete, on the basis of the separation data which has been received by said receiving unit, the address of the third communication apparatus from said address storage unit.

4. The first communication apparatus according to claim 2, wherein the third communication apparatus comprises an update data transmitting unit adapted to transmit an update data addressed to the predetermined address to update the remaining time left until the third communication apparatus separates from the predetermined network, and
the first communication apparatus further comprises an update unit adapted to update, on the basis of update data which has been received by said receiving unit, the remaining time stored in said remaining time storage unit.

5. A network system constituting a predetermined network comprising:
an address holding unit provided for a first communication apparatus participating in a predetermined network and adapted to hold a predetermined address to be used by a second communication apparatus not participating in the predetermined network in order to communicate with a third communication apparatus participating in the predetermined network when the second communication apparatus does participate in the predetermined network, as the address of the first communication apparatus;
a communication unit provided for the second communication apparatus and adapted to communicate with the first communication apparatus with the use of the predetermined address when the second communication apparatus participates into the predetermined network; and
a request unit provided for the first communication apparatus and adapted to request the third communication apparatus to hold the predetermined address as the address of the third communication apparatus in the case where the first communication apparatus separates from the predetermined network,
wherein the request unit performs the request before the first communication apparatus actually separates from the predetermined network, and
wherein said units are implemented by physical components of their respective communication apparatus,
wherein the first communication apparatus further comprises a remaining time storage unit adapted to store a remaining time left until each of communication apparatuses participating in the predetermined network, which has transmitted participation data addressed to the predetermined address to participate into the predetermined network, separates from the predetermined network, and
wherein the third communication apparatus is an apparatus corresponding to the longest remaining time among the remaining times stored in said remaining time storage unit.

6. The network system according to claim 5, further comprising:
an address storage unit provided for the first communication apparatus and adapted to store the addresses of communication apparatuses participating in the predetermined network; and
a state information storage unit provided for the first communication apparatus and adapted to store state information indicating the states of the communication apparatuses corresponding to the addresses stored by said address storage unit; wherein
the third communication apparatus is selected by said request unit on the basis of the state information stored by said state information storage unit in the case where the first communication apparatus separates from the predetermined network.

7. The network system according to claim 5, further comprising a participation data transmitting unit provided for the second communication apparatus and adapted to transmit the participation data addressed to the predetermined address to participate into the predetermined network;
a second address holding unit provided for the second communication apparatus and adapted to hold the predetermined address as the address of the second communication apparatus in the case where it is impossible to communicate with the first communication apparatus even though transmission of the participation data is attempted with the use of the predetermined address a predetermined number of times.

8. The network system according to claim 5, wherein the predetermined address is the second address set in addition to the IP address given to a communication apparatus in the IPv6 address space.

9. The network system according to claim 5, wherein the predetermined address is configured by a prefix acquired from a router and a predetermined value.

10. The network system according to claim 5, wherein the predetermined address is a global address in the IPv6 address space.

11. The network system according to claim 5, wherein the predetermined network is a peer-to-peer network.

12. A control method applied to a first communication apparatus participating in a predetermined network, the control method comprising:
an address holding step of holding a predetermined address to be used by a second communication apparatus not participating in the predetermined network in order to communicate with a third communication apparatus participating in the predetermined network when the second communication apparatus does participate in the predetermined network, as the address of the first communication apparatus;
a receiving step of receiving data addressed to the predetermined address; and a request step of requesting the third communication apparatus to hold the predetermined address as the address of the third communication apparatus in the case where the first communication apparatus separates from the predetermined network, wherein the request step performs the request before the first communication apparatus actually separates from the predetermined network, wherein the control method further comprises a remaining time storage step of storing a remaining time left until each of communication apparatuses participating in the predetermined network, which has transmitted participation data addressed to the predetermined address to participate into the predetermined network, separates from the predetermined network, and wherein the third communication apparatus is an apparatus corresponding to the longest remaining time among the remaining times stored in said remaining time storage step.

13. A communication method applied to a network system constituting a predetermined network, comprising:

an address holding step of a first communication apparatus, which participates in a predetermined network, holding a predetermined address to be used by a second communication apparatus not participating in the predetermined network in order to communicate with a third communication apparatus participating in the predetermined network when the second communication apparatus does participate in the predetermined network, as the address of the first communication apparatus;

a communication step of the second communication apparatus communicating with the first communication apparatus with the use of the predetermined address when the second communication apparatus participates into the predetermined network; and a request step of the first communication apparatus requesting the third communication apparatus to hold the predetermined address as the address of the third communication apparatus in the case where the first communication apparatus separates from the predetermined network, wherein the request step performs the request before the first communication apparatus actually separates from the predetermined network, wherein the communication method further comprises a remaining time storage step of storing a remaining time left until each of communication apparatuses participating in the predetermined network, which has transmitted participation data addressed to the predetermined address to participate into the predetermined network, separates from the predetermined network, and wherein the third communication apparatus is an apparatus corresponding to the longest remaining time among the remaining times stored in said remaining time storage step.

14. A non-transitory computer-readable storage medium storing a program for causing a computer to implement a control method applied to a first communication apparatus participating in a predetermined network, wherein the control method comprising:

an address holding step of holding a predetermined address to be used by a second communication apparatus not participating in the predetermined network in order to communicate with a third communication apparatus participating in the predetermined network when the second communication apparatus does participate in the predetermined network, as the address of the first communication apparatus;

a receiving step of receiving data addressed to the predetermined address; and a request step of requesting the third communication apparatus to hold the predetermined address as the address of the third communication apparatus in the case where the first communication apparatus separates from the predetermined network, wherein the request step performs the request before the first communication apparatus actually separates from the predetermined network, wherein the control method further comprises a remaining time storage step of storing a remaining time left until each of communication apparatuses participating in the predetermined network, which has transmitted participation data addressed to the predetermined address to participate into the predetermined network, separates from the predetermined network, and wherein the third communication apparatus is an apparatus corresponding to the longest remaining time among the remaining times stored in said remaining time storage step.

15. A non-transitory computer-readable storage medium storing a program for causing a computer to implement a communication method applied to a network system constituting a predetermined network, wherein the communication method comprising:

an address holding step of a first communication apparatus, which participates in a predetermined network, holding a predetermined address to be used by a second communication apparatus not participating in the predetermined network in order to communicate with a third communication apparatus participating in the predetermined network when the second communication apparatus does participate in the predetermined network, as the address of the first communication apparatus;

a communication step of the second communication apparatus, communicating with the first communication apparatus with the use of the predetermined address when the second communication apparatus participates into the predetermined network; and a request step of the first communication apparatus requesting the third communication apparatus to hold the predetermined address as the address of the third communication apparatus in the case where the first communication apparatus separates from the predetermined network, wherein the request step performs the request before the first communication apparatus actually separates from the predetermined network, wherein the communication method further comprises a remaining time storage step of storing a remaining time left until each of communication apparatuses participating in the predetermined network, which has transmitted participation data addressed to the predetermined address to participate into the predetermined network, separates from the predetermined network, and wherein the third communication apparatus is an apparatus corresponding to the longest remaining time among the remaining times stored in said remaining time storage step.

* * * * *